Jan. 17, 1961     H. N. K. PATON     2,968,425
DISCHARGEABLE BIN WITH SLOPABLE FLOOR
Filed Dec. 7, 1956

INVENTOR
HAMILTON NEIL KING PATON
BY
Fetherstonhaugh & Co.
ATTORNEYS

Jan. 17, 1961  H. N. K. PATON  2,968,425
DISCHARGEABLE BIN WITH SLOPABLE FLOOR
Filed Dec. 7, 1956  2 Sheets-Sheet 2
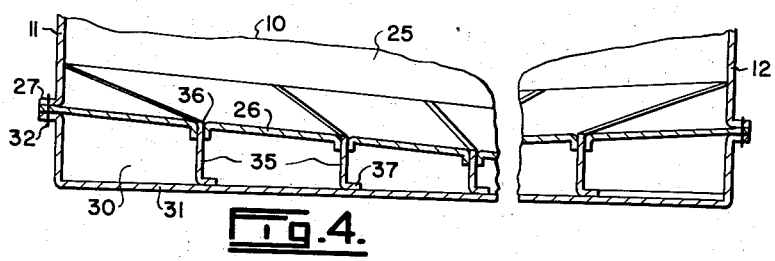
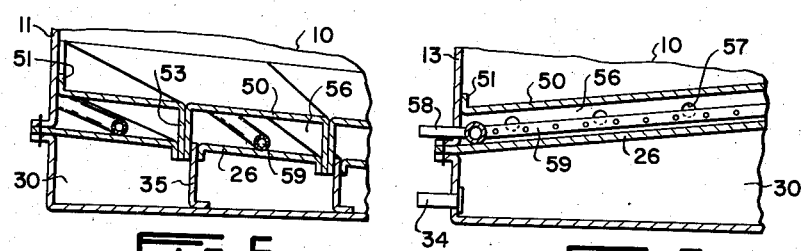
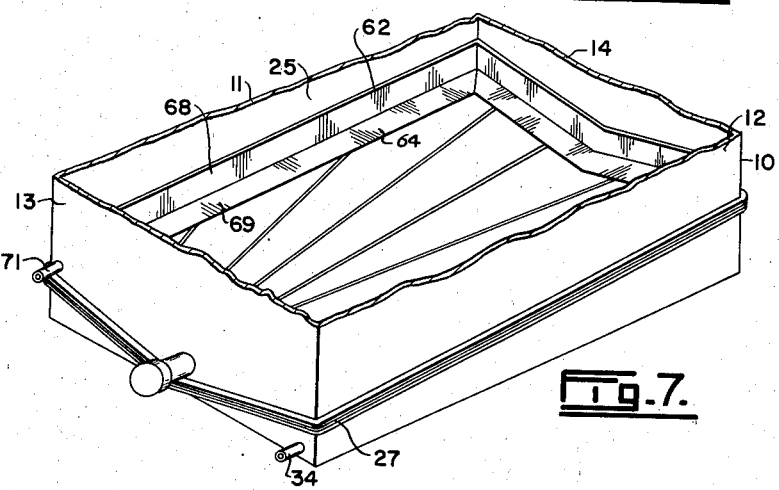
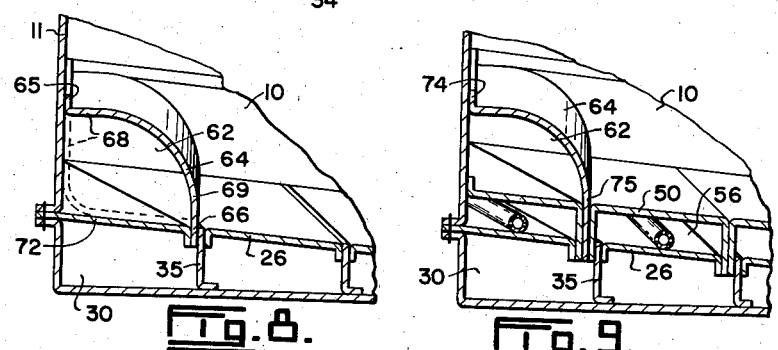
INVENTOR
HAMILTON NEIL KING PATON
BY
Featherstonhaugh & Co.
ATTORNEYS

# United States Patent Office 2,968,425
Patented Jan. 17, 1961

2,968,425

DISCHARGEABLE BIN WITH SLOPABLE FLOOR

Hamilton Neil King Paton, North Vancouver, British Columbia, Canada, assignor, by mesne assignments, to Mervan & Co., Vancouver, British Columbia, Canada Filed Dec. 7, 1956, Ser. No. 626,974

15 Claims. (Cl. 222—195)

This invention relates to a dischargeable bin which is preferably collapsible, but which may also be constructed as a non-collapsible bin.

The term "bin" as used in this specification and the accompanying claims is intended to include a bag or other flexible or non-flexible container, which may be used for any purpose whatsoever, such as for transporting or storing materials.

This bin may be used in transportation vehicles, such as railway cars and trucks, or in storage areas, such as warehouses. It is designed for materials in particle form, coarse or fine, such as flour, cement, sugar and the like. It protects the materials from moisture and contamination. The materials are directed into the bin through one or more openings in or near the top thereof, and they are removed through one or more discharge outlets at or near the bin bottom. The bin is provided with a floor arrangement which may be moved to a sloping position when desired. The floor or bottom slopes towards the discharge outlet of the bin so that material is directed towards said outlet. If desired, suitable means may be provided for aerating or fluidizing the material in the bin during discharge thereof, and/or means may be provided for dislodging material from around the edges of the bin bottom at the side walls thereof. When not required, the bin may be collapsed quickly and easily into a comparatively small bundle for storage or shipment.

A dischargeable bin according to the present invention comprises a holding chamber of any desired shape for small particle material, a bottom for the chamber raisable to an inclined position, a discharge outlet for the chamber at the bottom thereof to which the bottom slopes when raised, a gas chamber beneath the bottom, means for supplying gas, such as air or inert gas, to the gas chamber to raise the bottom to its inclined position. If desired, a gas-pervious bottom may be formed in the holding chamber above the air-impervious bottom to form a distribution chamber above the latter. In this case, suitable means is provided for directing gas, such as air or inert gas, into the distributing chamber, and this gas passes through the pervious bottom into the holding chamber. Furthermore, means may be provided in the holding chamber at the bottoms of the walls thereof, with or without the air-pervious bottom, to form an auxiliary chamber which may be inflated to dislodge any material that might tend to accumulate at the bottoms of the bin walls. Suitable means is provided for directing gas, such as air or inert gas, into this auxiliary chamber.

Examples of this invention are illustrated in the accompanying drawings, in which.

Figure 3:
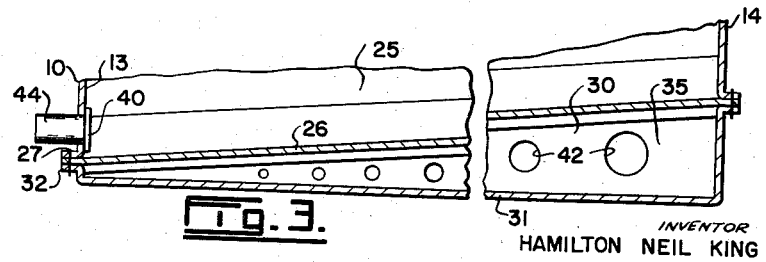

Figure 3 is an enlarged longitudinal section through the bottom of the bin showing the gas-impervious bottom thereof in its raised position during discharge, Figure 4 is an enlarged cross section through the bottom of the bin showing the gas-impervious bottom in its raised position, Figure 5 is a longitudinal sectional view similar to Figure 3 through a bin with a gas-pervious bottom above the gas-impervious bottom, Figure 6 is a cross section through the bin bottom arrangement of Figure 5, Figure 7 is a perspective view of the bin with the top portion thereof cut away to show a part of the bin bottom, and including means for dislodging material from the bottoms of the bin walls during discharge, Figure 8 is a cross sectional view similar to Figure 4 through the bottom arrangement of the bin of Figure 7, illustrating the means for dislodging material around the bottom of a bin wall, and Figure 9 is a sectional view similar to Figure 8 showing a bin having in addition to the feature of Figure 8 a gas-pervious bottom above the gas-impervious bottom of the bin.

Referring to Figures 1 to 4 of the drawings, 10 is a dischargeable bin which is preferably formed from a flexible material, such as canvas or nylon, treated to prevent gas and moisture from passing therethrough. This bin has side walls 11 and 12, end walls 13 and 14, and top 15. When the bin is made of flexible material, suitable means is provided for hanging it up in a closed area, such as a freight car, truck or storage room, said area having walls against which the bin walls are pressed when the bin is loaded in order to keep said bin walls from bulging outwardly too far. In this example, the bin is provided with a flange 16 around the top thereof having grommets 17 therein which may fit over hooks in the confining area in which the bin is located. As the storage or confining area in which the bin is located does not form part of this invention, it is not illustrated or described herein. However, it is sufficient to say that such area may be in a vehicle, such as a freight car or truck, or it may be storage space in a warehouse.

One or more filling openings 19 are provided in the top 15, and each opening may have a removable cover 20. If desired, these openings may be in a side or end wall of the bin near the top thereof.

Figure 1:
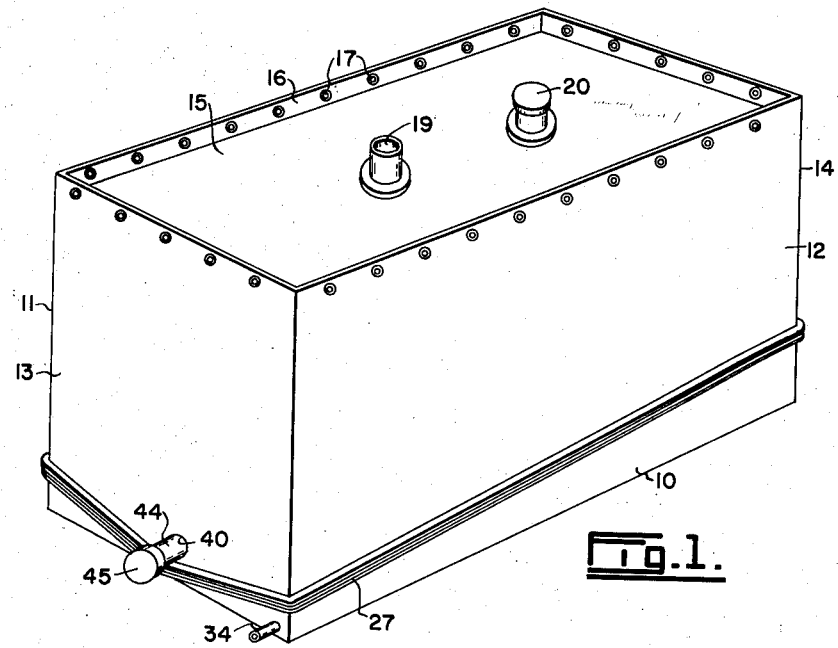
Figure 1 is a perspective view of a dischargeable bin.
Figure 2:
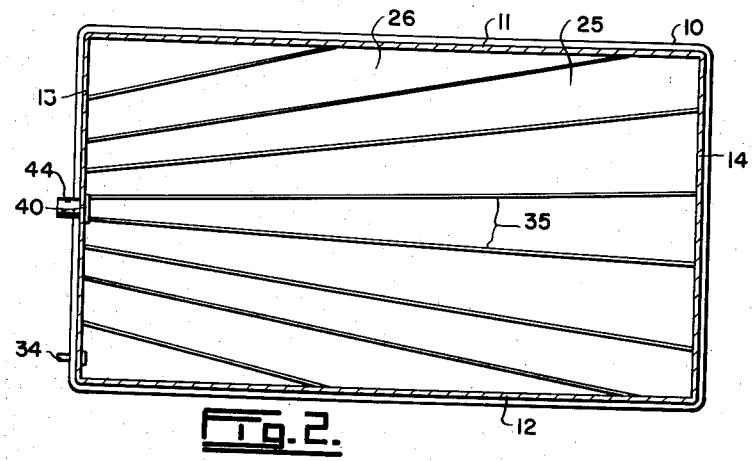
Figure 2 is a plan view of the bin with the top thereof removed.

Bin 10 forms a holding chamber 25, and said chamber has a first gas-impervious flexible bottom 26 which is secured to the side walls 11—12 and end walls 13—14 in any convenient manner, such as by stitching or gluing illustrated at 27 in Figures 1, 3 and 4. Bottom 26 normally lies in a substantially horizontal plane when the bin is loaded, but it is raisable to an inclined position relative to said horizontal plane, as shown in Figures 3 and 4. In the illustrated example, when bottom 26 is raised, it slopes downwardly from end wall 14 to end wall 13, and it extends inwardly and downwardly from side walls 11 and 12.

A gas chamber 30 is formed beneath bottom 26 by means of a second flexible gas-impervious bottom 31 having a peripheral flange 32 which is secured to the walls of the bin and bottom 26 at 27. Bottom 31 usually lies in a horizontal plane when the bin is in use. Gas, such as air or inert gas, may be directed under pressure into chamber 30 through a pipe 34.

As it is desirable to keep bottom 26 from billowing upwardly from bottom 31 when chamber 30 is inflated, a plurality of spaced flexible webs 35 may be provided. Each web is connected along its upper edge at 36 to bottom 26, and along its lower edge at 37 to bottom 31. These webs may radiate outwardly from a discharge outlet 40 located in wall 13 at bottom 26, as clearly shown in Figure 2. On the other hand, the webs may be substantially parallel to each other. A plurality of holes 42 may be formed in each web 35 so that the sections of chamber 30 formed by said webs are in communication with each other. However, if desired, some or all of the webs may be solid, in which case some or all of the chamber sections are kept separate from others so that it would be necessary to provide means for directing air into each chamber section or each group of sections. Furthermore, instead of the webs, the two bottoms may be sewn and/or glued together along lines where the webs are.

A short pipe 44 may project outwardly from the outlet 40, and a cover 45 is provided for this pipe. If desired, the outlet and pipe 44 may be in the bottom of the bin, in which case, the pipe would extend through bottoms 26 and 31.

The bin is loaded by directing material in particle form through the filler opening or openings 19. When covers 20 are on the openings, and cover 45 on discharge pipe 44, the contents of the bin are sealed against moisture or contamination. At this time, bottom 26 lies against bottom 31. When it is desired to unload the bin, one or both covers 20 is or are removed, and cover 45 is removed. At this time, a large percentage of the material will run out through the discharge opening 40. If desired, suitable suction means may be connected to pipe 44 to assist in removing the material. However, in order to get all the material out, chamber 30 is inflated, thereby raising bottom 26 to its sloping or inclined position. As it slopes towards the discharge outlet 40, the material tends to run towards said outlet. This form of bin is mainly for coarse materials.

Figures 5 and 6 illustrate means for fluidizing or aerating the material in bin 10 during discharge. This may be accomplished by providing a gas-pervious bottom 50 over gas-impervious bottom 26 in the bin. Bottom 50 is connected to the defining walls of the bin in any desired manner, such as by sewing and/or gluing at 51, see Figure 6. In order to keep bottom 50 from billowing upwardly from bottom 26, a plurality of webs 53 is provided extending between said bottoms. A distributing chamber 56 is formed by and between bottoms 50 and 26. Webs 53 may have holes 57 therein so that the different sections of the chamber formed by said webs are in communication with each other. Gas may be supplied to this chamber through a pipe 58. However, some or all of the webs may not have the holes therein, in which case the chamber sections are independent of each other, and it is necessary to supply gas individually to each section or each group of sections. Furthermore, pipe 58 may extend to a flexible pipe 59 which may be perforated and which extends longitudinally in each chamber section. These pipes help distribute the gas throughout the sections.

When the bin 10 of Figures 5 and 6 is discharging, chamber 30 at first remains deflated, while gas is directed into the distributor chamber 56. Pipes 59, if they are used, keep at least parts of bottom 50 away from bottom 26, thereby forming spaces into which the gas is first directed when there is a load in the bin. If these pipes are not used, it is desirable to have ropes or other means in the chamber sections to form these gas spaces. This gas is forced through the gas-pervious bottom 50 to fluidize the material in the holding chamber 25. This greatly assists in the discharge of the material from the chamber. After a large portion of the material has been discharged, gas is directed into chamber 30 to raise the gas-impervious bottom 26 to its inclined position. This, in turn, raises gas-pervious bottom 50 to an inclined position so that material thereon is directed towards the outlet 40.

Figures 7 and 8 show the discharge bin 10 without distributing chamber 56, but with an auxiliary chamber 62 around the bottoms of the side walls 11—12 and end wall 13 to dislodge material from around said walls. This chamber is formed by a low wall consisting of a strip of flexible material 64 which is connected to the bin wall at 65 and bottom 26 at 66. This material normally is substantially L-shaped in cross section, and has a vertical section 68 and horizontal section 69 lying against the bin wall and bottom 26, respectively. Gas may be directed into chamber 62 through a pipe 71. If desired, the portion 72 of bottom 26 beneath the auxiliary chamber may be gas-impervious so that gas is introduced into said chamber through this bottom portion. In the latter case, pipe 71 may or may not be omitted.

When chamber 62 is inflated, wall 64 moves outwardly from the bin wall and bottom, as clearly shown in Figure 8. This moves any material away from the bottom of the bin wall. The sections 68 and 69 of the strip 64 may both be formed of gas-impervious material, or either or both of said sections may be formed of gas-pervious material.

The bin of Figures 7 and 8 may be discharged in the same manner as that of Figures 1 to 4. It is usually advisable to wait until most of the material has been discharged from the bin before inflating chamber 62. This action directs any material which may have accumulated around the bottom of the bin walls towards the center of the bin bottom, so that it is discharged with the rest of the material.

Figure 9 illustrates bin 10 including the features of the bins of Figures 6 and 8. In other words, the bin of Figure 9 includes the distributing chamber 56 and the auxiliary chamber 62. In this example, the only difference between it and that of Figure 8 is that the wall 64 is connected at one edge at 74 to the confining wall of the bin, and at its opposite edge at 75 to air-pervious bottom 50.

When the bin of Figure 9 is being discharged, gas is first directed into distributing chamber 56 so that it passes through the pervious bottom 50 and fluidizes the material in the bin. When most of the material is discharged, chamber 30 is inflated to raise the bottoms 26 and 50 to their inclined positions. At this time or later, chamber 62 is inflated to clear any material away from the bottoms of the bin walls.

As stated above, dischargeable bin 10 is preferably formed of a flexible material, in which case it is actually a bag. However, it may have rigid walls and top, and be provided with any one of the different flexible bottom arrangements illustrated in Figures 4, 6 or 8.

What I claim as my invention is:

1. A dischargeable bin having a slopable bottom for materials in small particle form, comprising a holding chamber for small particle material, a gas-pervious fluidizing bottom for the chamber raisable to an inclined position, a discharge outlet for the chamber at the bottom thereof to which the bottom slopes when raised, a gas chamber beneath the bottom inflatable to raise said bottom to its inclined position, and means for supplying gas to the holding chamber through the pervious bottom to fluidize small particle material therein.

2. A dischargeable bin having a slopable bottom for materials in small particle form, comprising a holding chamber in the form of a collapsible bag for small particle material, a gas-pervious pliable fluidizing bottom for the chamber raisable to an inclined position, a discharge outlet for the chamber at the bottom thereof, an air compartment beneath the bottom inflatable to raise said bottom to its inclined position, and means for supplying gas to the holding chamber through the pervious bottom to fluidize small particle material therein.

3. A dischargeable bin having a slopable bottom for materials in small particle form, comprising a holding chamber for small particle materials, a gas-impervious sheet beneath the chamber movable from a normal horizontal position to a sloping position, means beneath said sheet for raising it to its sloping position, distributing means in the chamber carried by said sheet for admitting gas to the chamber to fluidize the material, and an inlet for said distributing means through which gas may be supplied thereto.

4. A dischargeable bin having a slopable bottom for materials in small particle form, comprising a holding chamber for small particle materials, a gas-impervious sheet beneath the chamber movable from a normal horizontal position to a sloping position, a gas chamber beneath said sheet inflatable to raise the sheet thereof to its sloping position, means for admitting gas to the gas chamber, distributing means extending over and spaced above said sheet throughout the holding chamber for admitting gas to the holding chamber to fluidize the material therein, and means for admitting gas directly to said distributing means.

5. A dischargeable bin having a slopable bottom for materials in small particle form, comprising a holding chamber for small particle material, a gas-pervious fluidizing bottom for the chamber, a gas-impervious sheet beneath said bottom and forming a distributing chamber therebetween, said bottom and said sheet being raisable to an inclined position, a discharge outlet for the chamber at the bottom thereof to which the bottom slopes when raised, a gas chamber beneath the impervious sheet inflatable to raise both said bottom and said sheet to sloping position, means for admitting gas to the distributing chamber, said gas passing through the bottom to fluidize material in the holding chamber, and means for admitting gas to the gas chamber to raise said bottom and said sheet to the sloping position to direct material to the outlet.

6. A dischargeable bin having a slopable bottom for materials in small particle form, comprising a holding chamber for small particle material, a gas-pervious fluidizing bottom for the chamber raisable to an inclined position, a discharge outlet for the chamber at the bottom thereof to which the bottom slopes when raised, a gas chamber beneath the bottom inflatable to raise said bottom to its inclined position, means for supplying gas to the holding chamber through the pervious bottom to fluidize small particle material therein, a low flexible wall secured to and normally lying against the holding chamber wall and the pervious bottom at least part way around said holding chamber, said low wall forming an auxiliary chamber over the pervious bottom at the holding chamber wall, and means for directing gas into the auxiliary chamber to blow the low wall away from the holding chamber wall and the pervious bottom to dislodge material from around the bottoms of the holding chamber walls.

7. A dischargeable bin having a slopable bottom for materials in small particle form, comprising a holding chamber in the form of a collapsible bag for small particle material, a gas-pervious pliable fluidizing bottom for the chamber raisable to an inclined position, means for supplying gas to the holding chamber through the pervious bottom to fluidize small particle material therein, a low flexible wall secured to and normally lying against the holding chamber wall and the pervious bottom at least part way around said holding chamber, said low wall forming an auxiliary chamber over the pervious bottom at the holding chamber wall, and means for directing gas into the auxiliary chamber to blow the low wall away from the holding chamber wall and the pervious bottom to dislodge material from around the bottoms of the holding chamber walls.

8. A dischargeable bin having a slopable bottom for materials in small particle form, comprising a holding chamber for small particle material, a first gas-impervious bottom for the chamber raisable to an inclined position, a discharge outlet for the chamber at the bottom thereof to which the bottom slopes when raised, a second gas-impervious bottom beneath the first bottom and connected thereto around its edges, said bottoms forming therebetween a gas chamber, a gas-pervious fluidizing bottom over the first impervious bottom secured to the latter around its edges and forming therewith a distributing chamber, means for directing gas into the distributing chamber, said gas passing through the pervious bottom into the holding chamber to fluidize small particle material in the latter, and means for directing gas into the gas chamber to raise the first impervious bottom and the pervious bottom to an inclined position to direct the material to the outlet.

9. A dischageable bin as claimed in claim 8 including means in the distributing chamber for preventing the pervious bottom from being completely pressed against the first impervious bottom under load of material in the holding chamber.

10. A dischargeable bin having a slopable bottom for materials in small particle form, comprising a holding chamber for small particle material, a first gas-impervious bottom for the chamber raisable to an inclined position, a discharge outlet for the chamber at the bottom thereof to which the bottom slopes when raised, a second gas-impervious bottom beneath the first bottom and connected thereto around its edges, said bottoms forming therebetween a gas chamber, a gas pervious fluidizing bottom over the first impervious bottom secured to the latter around its edges and forming therewith a distributing chamber, a plurality of spaced webs connected along edges thereof to the pervious and the first impervious bottoms dividing the distributing chamber into sections and preventing the pervious bottom from billowing away from the first impervious bottom, means for directing gas into the distributing chamber sections, said gas passing through the pervious bottom into the holding chamber to fluidize small particle material in the latter, and means for directing gas into the gas chamber to raise the first impervious bottom and the pervious bottom to an inclined position to direct the material to the outlet.

11. A dischargeable bin as claimed in claim 10 including means in each distributing chamber section for preventing the pervious bottom from being completely pressed against the first impervious bottom under load of material in the holding chamber.

12. A dischargeable bin as claimed in claim 8 including a low flexible wall secured to and normally lying against the holding chamber wall and the pervious bottom at least part way around said holding chamber, said low wall forming an auxiliary chamber over the pervious bottom at the holding chamber wall, and means for directing gas into the auxiliary chamber to blow the low wall away from the holding chamber wall and the pervious bottom to dislodge material from around the bottoms of the holding chamber walls.

13. A dischargeable bin as claimed in claim 12 including means between the first impervious and the pervious bottoms for preventing the latter from being pressed against the former under load of material in the holding chamber.

14. A dischargeable bin having a slopable bottom for materials in small particle form, comprising a holding chamber for small particle material, a first gas-impervious bottom for the chamber raisable to an inclined position, a discharge outlet for the chamber at the bottom thereof to which the bottom slopes when raised, a second gas-impervious bottom beneath the first bottom and connected thereto around its edges, said bottoms forming therebetween a gas chamber, a gas-pervious fluidizing bottom over the first impervious bottom secured to the latter around its edges and forming therewith a distributing chamber, a plurality of spaced webs connected along edges thereof to the pervious and the first impervious bottoms dividing the distributing chamber into sections and preventing the pervious bottom from billowing away from the first impervious bottom, means for directing gas into the distributing chamber sections, said gas passing through the pervious bottom into the holding chamber to fluidize small particle material in the latter, means for directing gas into the gas chamber to raise the first impervious bottom and the pervious bottom to an inclined position to direct the material to the outlet, a low flexible wall secured to and normally lying against the holding chamber wall and the pervious bottom at least part way around said holding chamber, said low wall forming an auxiliary chamber over the pervious bottom at the holding chamber wall, and means for directing gas into the auxiliary chamber to blow the low wall away from the holding chamber wall and the pervious bottom to dislodge material from around the bottoms of the holding chamber walls.

15. A dischargeable bin as claimed in claim 14 including means in each distributing chamber section between the first impervious and the pervious bottoms for preventing the latter from being pressed against the former under load of material in the holding chamber.

References Cited in the file of this patent

UNITED STATES PATENTS

| | | |
|---|---|---|
| 2,609,125 | Schemm | Sept. 2, 1952 |
| 2,646,905 | Vincent | July 28, 1953 |
| 2,732,099 | Davis | Jan. 24, 1956 |
| 2,792,262 | Hathorn | May 14, 1957 |

OTHER REFERENCES

Pneubin, (Advertisement), Gerotor May Corporation, Baltimore, Md.